United States Patent
Biacs et al.

[19]
[11] Patent Number: 6,049,303
[45] Date of Patent: *Apr. 11, 2000

[54] GLOBAL POSITIONING SYSTEM HAVING POSTPROCESSED REALTIME CORRECTED DATA

[75] Inventors: Zoltan Biacs, San Francisco; Dominic Farmer, Milpitas, both of Calif.

[73] Assignee: Trimble Navigation Limited, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/327,041

[22] Filed: Jun. 7, 1999

Related U.S. Application Data

[63] Continuation of application No. 08/935,576, Sep. 23, 1997, Pat. No. 5,973,639.

[51] Int. Cl.[7] ............................... H04B 7/185; G01S 5/02
[52] U.S. Cl. ........................................ 342/357.03; 701/215
[58] Field of Search ...................... 342/357.02, 357.03, 342/357.09, 357.12, 357.13; 701/215

[56] References Cited

U.S. PATENT DOCUMENTS 5,528,248  6/1996  Steiner et al. .

*Primary Examiner*—Theodore M. Blum
*Attorney, Agent, or Firm*—Wagner, Murabito & Hao LLP

[57] ABSTRACT

A method for determining an improved position fix by performing postprocessing on a realtime differentially corrected GPS position. A remote rover unit containing a GPS receiver is used to determine a differentially corrected position according to measured pseudoranges and realtime pseudorange correction vectors is broadcast by a base station. The rover unit applies realtime corrections to measurements to determine a more accurate realtime differential position. It then stores the realtime differential position and the realtime pseudorange correction vector. Subsequently, postprocessing is performed to determine a postprocessed pseudorange correction vector. A difference vector representing the difference between the realtime pseudorange correction vector and the postprocessed pseudorange correction vector is then determined. This difference vector is applied to the realtime differential position to calculate a more accurate, improved position fix. This same process can be applied to determine velocities as well.

13 Claims, 4 Drawing Sheets

GLOBAL POSITIONING SYSTEM HAVING POSTPROCESSED REALTIME CORRECTED DATA

This application is a continuation of Ser. No. 08/935,576 filed Sep. 23, 1997, U.S. Pat. No. 5,973,639.

FIELD OF THE INVENTION

The present invention relates to an apparatus and method for generating post-processed, real-time corrected positions and/or velocities in a global positioning system (GPS).

BACKGROUND OF THE INVENTION

GPS has been widely adopted in the fields of navigation and positioning. Through GPS, extremely accurate three-dimensional position, velocity, and timing information can be attained by users equipped with GPS receivers anywhere in the world. Basically, a constellation of orbiting GPS satellites continuously broadcasts encoded signals back to earth. Each of the twenty-four GPS satellites transmits its encoded signal containing relevant identification, position, and time information. A ground-based or airborne GPS receiver is then used to pick up and process the encoded signals received from a number of these GPS satellites. Based on the received GPS information, the receiver can obtain a position fix with an accuracy of approximately ten meters in each axis.

Although a ten-meter level of accuracy is exceptional in light of the relative distances involved, there are many applications, such as collision avoidance, surveying, mapping, tracking, etc., which require a much higher degree of accuracy. One technique for improving the accuracy is known as "differential" GPS. In differential GPS, a base station or beacon is placed at a known position (e.g., as determined by traditional surveying techniques). A GPS receiver housed within the base station measures its position based on GPS signals received from the satellites. Since the true position of the base station is already known, the differences between the measured versus the actual position can easily be determined. This difference represents the aggregate errors attributable to various natural, uncontrollable sources (e.g., satellite clock error, ephemeris error, tropospheric and ionospheric delay error, noise/quantization error. Once these errors have been determined, their effects can be minimized by applying realtime corrections. The base station continuously calculates and broadcasts updated real-time corrections. Assuming that a nearby remote "roving" GPS receiver also experiences similar errors, it can compensate for these errors by adjusting its measurements according to the realtime correction information received from a nearby base station or beacon. With standard real time differential GPS, position accuracies of 1–5 meters can be attained. A more detailed description of differential GPS is given by Blackwell, *Overview of Differential GPS Methods*, Navigation: Journal of The Institute of Navigation, Vol. 32, No. 2, Summer 1985, pp 114–125 and U.S. Pat. Nos. 5,523,763 and 5,495,257.

Unfortunately, there are several limitations associated with differential GPS. One main limitation is the fact that the base stations are required to have a data transmission link with a speed of data transmission at a certain baud rate set forth in a defined specification. By today's standards, the specified baud rate appears to be quite low; however, it is well-established and universally adopted. This specified baud rate is insufficient and does not have the capacity to transmit the amount of differential correction information associated with the multitude of satellites necessary for maximum error compensation. Furthermore, it takes time for the base station to process and update the differential correction information, resulting in transmission delays. In addition, other errors, such as interpolation, ionospheric and tropospheric propagation errors, base station receiver errors, synchronization and other timing errors, may exist.

In order to minimize these errors, a technique known as "postprocessed" GPS was developed. With conventional postprocessed GPS, the measurement data gathered in realtime in the field by a roving GPS receiver is brought back to a central office and downloaded to a computer system. The computer system has access to a large database containing comprehensive GPS information relating to a number of base stations. Specially designed software compiles all of this information and applies rigorous processing to the downloaded data gathered in realtime. After performing iterative processing, postprocessed corrected position fixes are determined. In this manner, many of the latencies and timing errors associated with differential GPS are minimized, resulting in accuracies in the range of approximately less than 1 meter.

Although conventional post-processed GPS is extremely accurate, it suffers from several drawbacks. First, full measurement data are typically logged. This requires a high-capacity disk drive for storing the large amount of data or other forms of media are used—Ram, Flash memory, etc. Otherwise, the user would be required to make many trips back and forth to the field. Another disadvantage is that since full post-processing requires iterative recomputation of complete position/velocity fixes, a lengthy amount of time is expended and expensive, sophisticated computing resources are required.

In light of these and other problems, there is a need for a fast, efficient, and yet highly accurate method for determining post-processed positions/velocities. The present invention provides one solution, whereby the accuracies of differential GPS positions/velocities are improved with minimal amount of additional processing. The present invention also optimizes data transmission while minimizing the storage requirements of position/velocity, time, and differential correction information. Furthermore, the present invention actually provides a method to adjust realtime differential GPS positions and velocities with computed (postprocessed) differential measurement corrections without the need for logging full measurement data, and also without the need of iterative recomputation of complete position/velocity fixes during conventional postprocessing.

SUMMARY OF THE INVENTION

The present invention pertains to a method for determining an improved position fix by performing postprocessing on a realtime differentially corrected GPS position. Initially, a remote rover unit containing a GPS receiver is used to gather, process, and store GPS information in the field. Measured pseudoranges and base station corrections are combined first. Thereupon, the real time position and velocity fix is computed using an iterative process. The remote rover unit then temporarily stores the realtime differential position and the realtime pseudorange correction vector. Subsequently, this data is downloaded to a computer system which has software for performing postprocessing. In the postprocessing procedure, a postprocessed pseudorange correction vector is calculated first. Next, a difference vector representing the difference between the realtime pseudorange correction vector and the postprocessed pseudorange correction vector is determined. This difference vector is applied to the realtime differential position, which makes it even more accurate. It is this improved position fix which is ultimately output for display. This same process can also be applied to determine postprocessed differential velocities as well.

BRIEF DESCRIPTION OF THE DRAWINGS

The operation of this invention can be best visualized by reference to the drawings.

DETAILED DESCRIPTION

A GPS system having a method for realtime postprocessed correction is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention as well as matrix equations are given to further illuminate the underlying algorithm.

Figure 1:
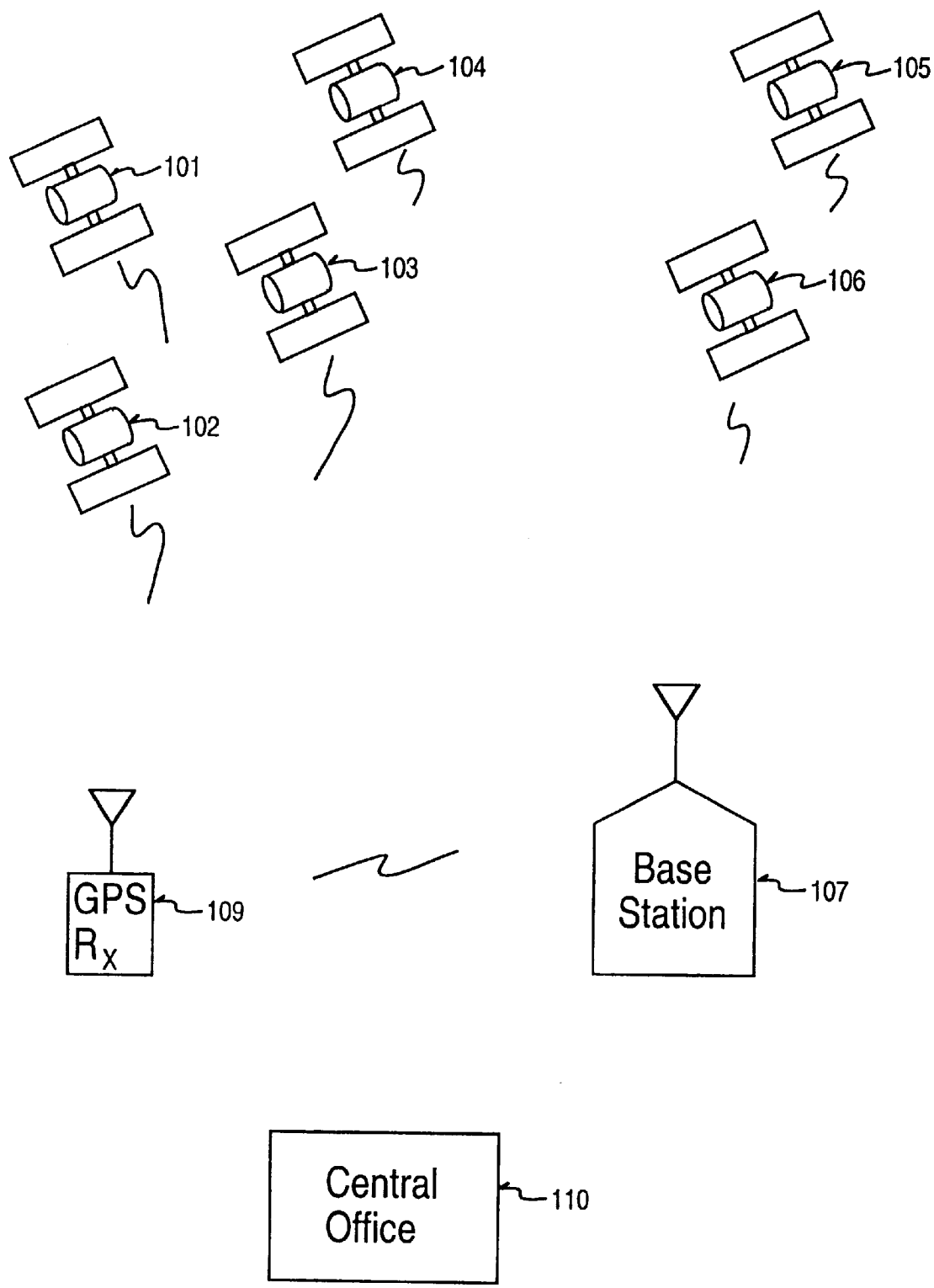
FIG. 1 shows a roving GPS receiver, a number of GPS satellites, a base station, and a central office for performing differential and postprocessed GPS.

FIG. 1 shows a roving GPS receiver, a number of GPS satellites, a base station, and a central office for performing differential and postprocessed GPS. In this figure, as an example, a set of six orbiting GPS satellites 101–106 are visible to the rover unit 109. In a general case 4 or more satellites are needed to determine a position/velocity fix. The rover unit 109 contains a GPS receiver and may optionally include a handheld or portable computer. The rover unit 109 calculates six pseudoranges, one for each of the six satellites 101–106. Likewise, six pseudoranges are determined by the GPS receiver housed within base station 107. Since the position of base station 107 is already known, as determined by traditional surveying methods, realtime pseudorange correction ($PRC_{RT}$) information can be calculated by base station 107 to compensate for errors in each of its six measured pseudoranges. This $PRC_{RT}$ information is omnidirectionally broadcast by base station 107. Rover unit 109 picks up the $PRC_{RT}$ information and performs corrections and computations to determine realtime differential GPS positions/velocities. In addition, rover unit 109 can store the data gathered in the field and subsequently download this field data to a host computer system back at the central office 110. Thereupon, a computer back at the central office 110 performs postprocessing to determine postprocessed position/velocity fixes. Generally, postprocessed position/velocity fixes are more accurate than realtime position/velocity fixes because, with postprocessing, certain errors are minimized (e.g., transmission delays, time propagation and interpolation errors, atmospheric delays, base station receiver errors and other factors. However, the present invention offers a method for adjusting realtime differential positions/velocities with computed postprocessed differential measurement corrections to improve the accuracy of the rover unit.

Figure 2:
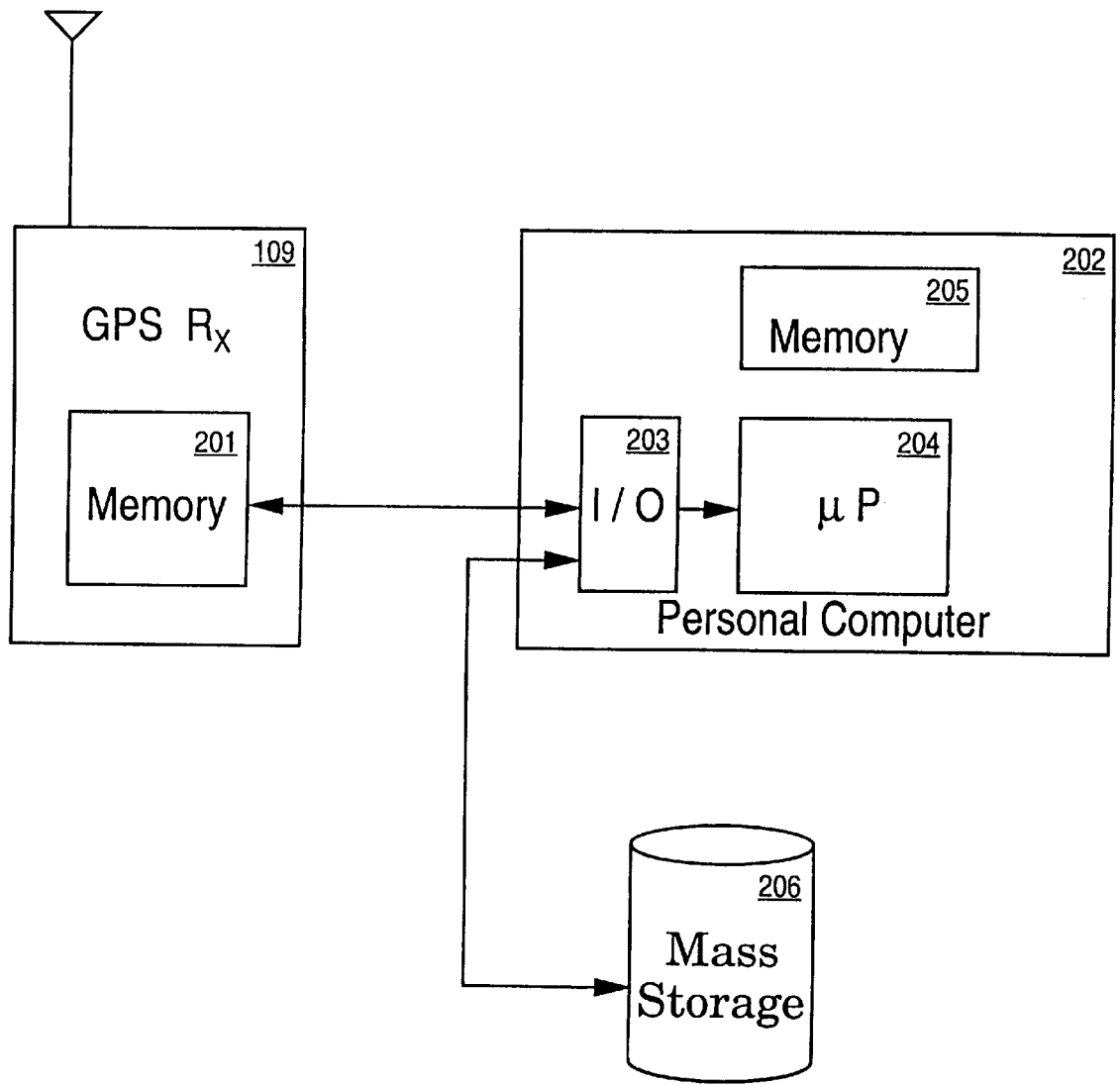
FIG. 2 shows a block diagram of a computer system used to perform postprocessed GPS.

FIG. 2 shows a block diagram of a computer system used to perform postprocessed GPS. A remote rover unit 109 is used to collect data gathered in the field. As rover unit 109 moves about, it continuously receives and processes data being broadcast from overhead GPS satellites. This data consists of time and position/velocity information in terms of pseudoranges and Doppler measurements. Meanwhile, $PRC_{RT}$ information is also being received from a base station (e.g., Coast Guard beacon). Rover receiver 109 continuously applies the $PRC_{RT}$ correction to measured pseudoranges to determine realtime differential position/velocity fixes. In addition, satellite selection information is also gathered and processed in order to keep track of the various satellites which were used in determining the position/velocity fixes. This information is important for matching the available measurement corrections from the base station receiver with measurements used by the rover receiver 109. In the present invention, rather than storing full measurement information, only the resultant position/velocity fixes and $PRC_{RT}$ data is stored by the rover unit 109. This greatly reduces data storage requirements. The rover unit 109 stores is data in memory 201, which is typically comprised of a memory chip.

Upon arriving back at the central station, the rover unit 109 is linked to a personal computer, workstation, or mainframe 202. Computer system 202 is comprised of an input/output interface 203, one or more microprocessors 204, and memory 205. Software stored in memory 205 instructs the microprocessor 204 to calculate pseudorange and pseudorange rate corrections (PRC and RRC) for each GPS satellite by using base station measurements. The base station measurements are stored in a database residing in mass storage device 206. A postprocessed pseudorange correction ($PRC_{PP}$) as well as pseudorange rate correction vector ($RRC_{PP}$) vector is applied for the rover unit 109 by applying a well-known Least Squares model. The final result of this process is a set of postprocessed differential position/velocity fixes. In the present invention, the $PRC_{RT}$ vector is subtracted from the $PRC_{PP}$ vector to determine a second order correction vector $\nabla \Delta x$ in the position/velocity domain. This $\nabla \Delta x$ vector is used to adjust the differential position/velocity fix that was stored in realtime, to compute the post-processed position/velocity fix. Accuracy improvements of approximately a factor of two have been experienced by practicing the present invention.

Figure 3:
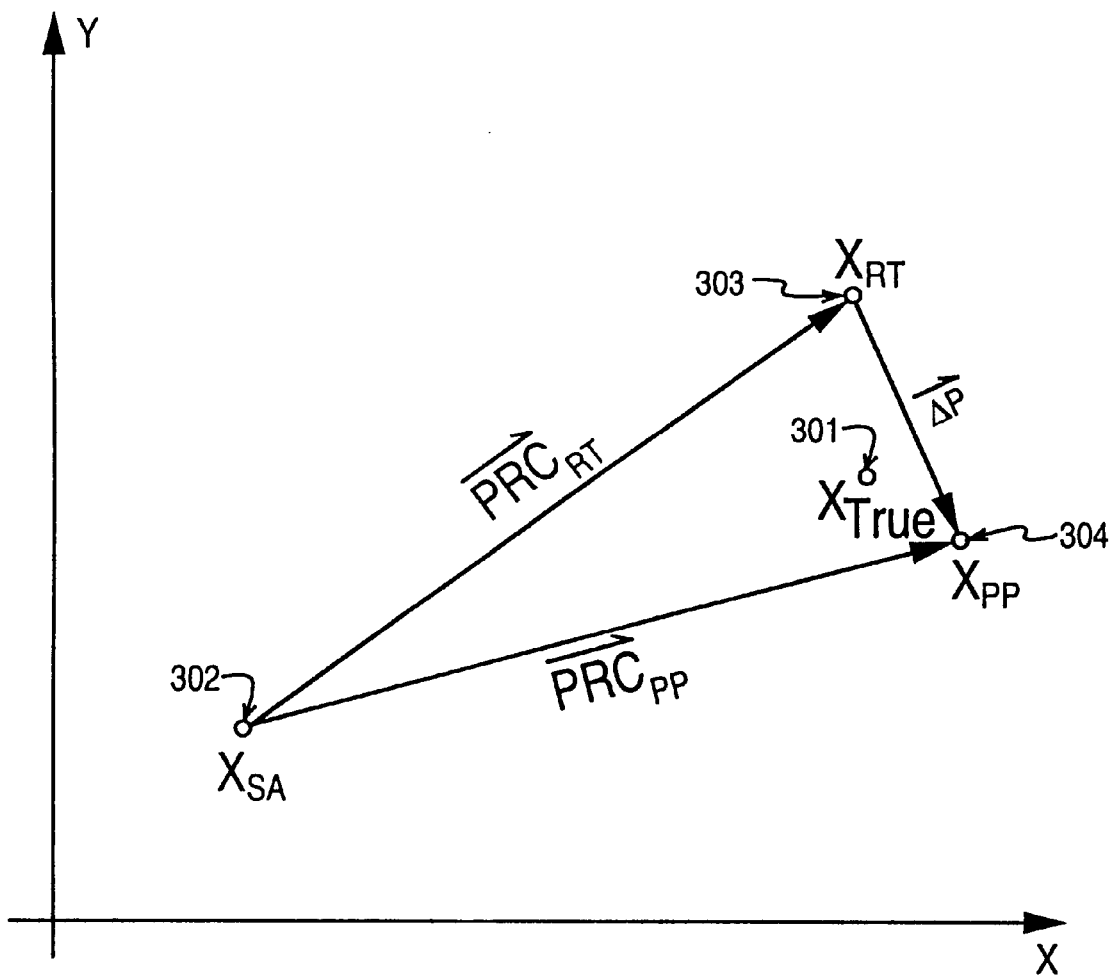
FIG. 3 is a plot showing how the accuracy of a realtime differential GPS position is improved by applying postprocessed correction.

FIG. 3 is a plot showing how the accuracy of a realtime differential GPS position is improved by applying postprocessed correction. The true position, $X_{TRUE}$, is given by location 301. However, due to errors (e.g., selective availability, measurement noise ionospheric and tropospheric delays, multipath errors, satellite clock error, ephemeris error, the uncorrected, non-differential position, $X_{SA}$, is calculated by the rover unit to be at location 302. The difference between $X_{SA}$ and $X_{TRUE}$ can be approximately 100 meters at current levels of selective availability. By performing realtime differential GPS, a more accurate position can be determined. The correction information, supplied by a base station or beacon, is used by the remote unit to determine the $PRC_{RT}$ vector. This $PRC_{RT}$ vector is applied to the measured $X_{SA}$ position to calculate a realtime differentially corrected position, $X_{RT}$, at location 303. It can be seen that $X_{RT}$ is closer to $X_{TRUE}$ than $X_{SA}$. The difference between $X_{RT}$ and $X_{TRUE}$ is approximately 1–5 meters. Instead of storing $X_{SA}$ information, the present invention stores the $PRC_{RT}$ and $X_{RT}$ information. Consequently, the present invention minimizes storage requirements because there is now no need to store full pseudorange nor pseudorange rate (Doppler) measurements.

Next, postprocessing is performed. The realtime $PRC_{RT}$ and $X_{RT}$ information that was temporarily stored is subsequently downloaded to a computer system. The computer system calculates a $PRC_{PP}$ vector according to well-known postprocessing techniques. Rather than applying this $PRC_{PP}$ vector to the $X_{SA}$ location to determine the postprocessed location, $X_{PP}$ (shown as location 304), the present invention subtracts the $PRC_{PP}$ vector from the $PRC_{RT}$ vector to determine a second order correction vector, $\Delta RPC$. This vector is then applied to the realtime differential $X_{RT}$ position to determine $X_{PP}$. Thus, with the present invention, there is no need for iteratively recomputing the position/velocity fix solution. The difference between $X_{PP}$ and $X_{TRUE}$ is approximately less than 1 meter. Hence, one of the advantages of the present invention is the achievement of a higher degree of accuracy in postprocessed differential GPS than the differential GPS solution computed in realtime. It should be noted that although only two dimensions are shown in the graph, in actuality the vectors are applied in three dimensions (x, y, and z axes). Furthermore, the same process discussed above for position calculations can also be applied to velocity calculations. In addition, the method described above can be repeated to simultaneously adjust and test the realtime differential GPS positions and/or velocities with several different sets of base station data from one or more base stations. This can be accomplished to ensure quality control.

Figure 4:
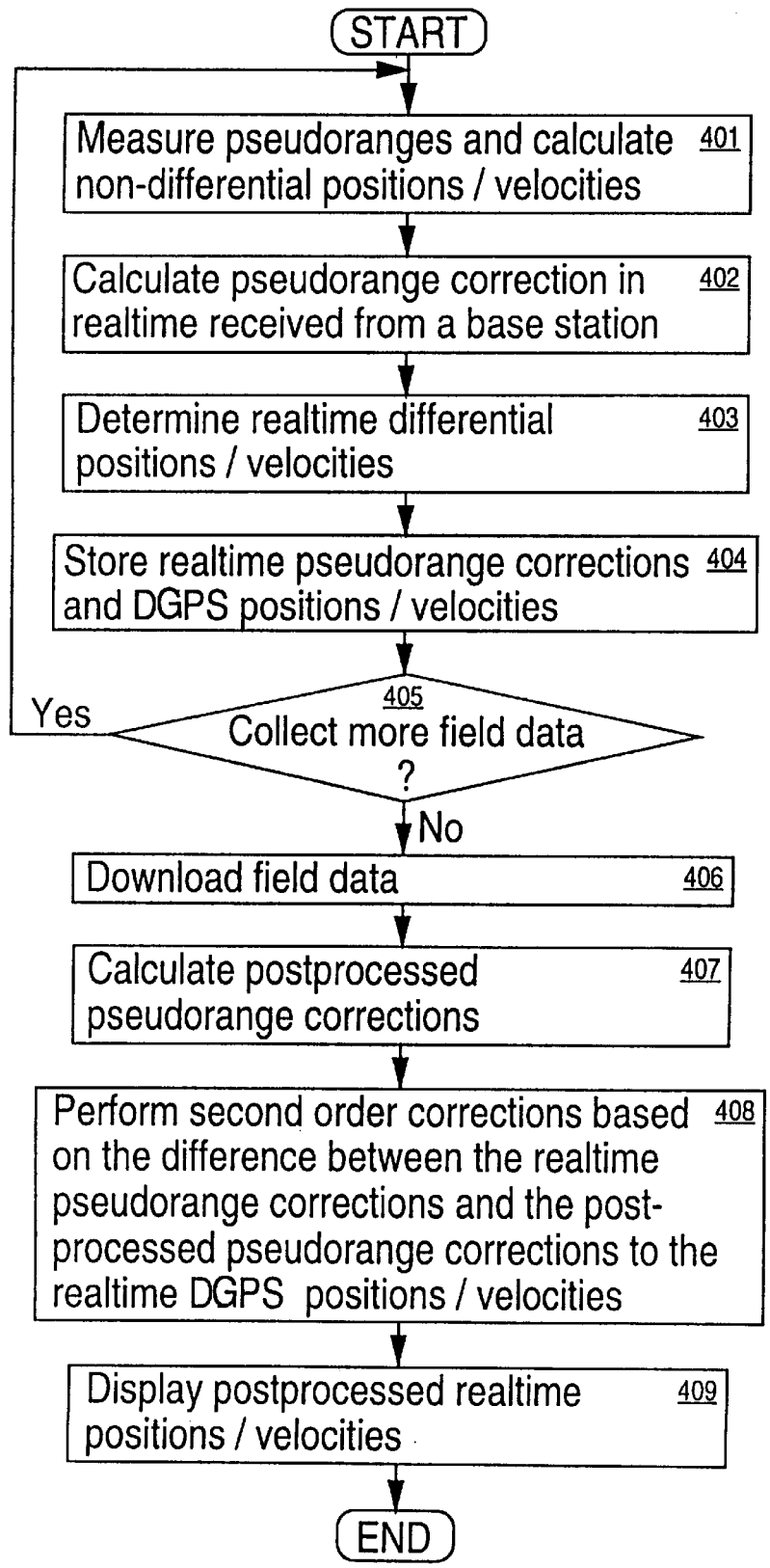
FIG. 4 is a flowchart describing the steps for performing postprocessing of realtime differential GPS positions and velocities.

FIG. 4 is a flowchart describing the steps for performing postprocessing of realtime differential GPS positions and velocities. Initially, in step 401, a remote rover unit in the field receives GPS signals from orbiting satellites and calculates pseudorange measurements. Next, realtime PRC and RRC data calculated by a base station are received, and the pseudoranges are combined with these corrections, step 402. In step 403, the realtime differential positions and velocities are calculated. Note that if both nondifferential measurements and differential corrections are available, they are combined into differentially corrected measurements and used for computing a differentially corrected position and velocity. The realtime pseudorange and pseudorange rate corrections and DGPS positions/velocities are temporarily stored, step 404. Steps 401–404 are repeated until the user decides that enough data has been gathered for that particular mission, step 405. Back at the central station or home base, the data stored by the rover unit is downloaded into a computer system, step 406. Based on the base station data, the computer system calculates postprocessed pseudorange corrections, step 407. Thereupon, the realtime DGPS positions/velocities are adjusted based on the differences between the realtime pseudorange corrections and the postprocessed pseudorange corrections, step 408. This step is named second order correction. Lastly, the resulting postprocessed realtime positions/velocities are output for display, step 409.

The method for determining $PRC_{RT}$ and $PRC_{PP}$ and their use in performing first and second order correction is now described. The GPS position and velocity estimation process is represented by the standard linear estimation model in matrix notation form. The relationship between measurements and unknown parameters is represented by e.g. Koch, Karl-Rudolf, *Parameter Estimation and Hypothesis Testing in Linear Models*, Springer-Verlag, New York, 1987:

$$E(1)=f(x)=Ax$$

where

E(.) is the expectation operator, f(x) is a function of unknowns, $1^T=[1_1 1_2 \ldots 1_n]$ is a vector of (n) measurements from satellites, $x^T=[X\ Y\ Z\ \Delta T]$ is a vector of (4) position+receiver clock bias unknowns, or $=[V_X V_Y V_Z \Delta D]$ is a vector of (4) velocity+receiver dock drift unknowns.

Matrix A is a (4xn) coefficient matrix and it contains partial derivatives of measurements as functions of unknown parameters (x).

$$A = \begin{bmatrix} \frac{\partial l_1}{\partial x} & \frac{\partial l_1}{\partial y} & \frac{\partial 1 l_1}{\partial z} & \frac{\partial 1 l_1}{\partial \Delta T} \\ \frac{\partial l_2}{\partial x} & \frac{\partial l_2}{\partial y} & \frac{\partial l_2}{\partial z} & \frac{\partial l_2}{\partial \Delta T} \\ \vdots & \vdots & \vdots & \vdots \\ \frac{\partial l l_n}{\partial x} & \frac{\partial l l_n}{\partial y} & \frac{\partial l_n}{\partial z} & \frac{\partial l_n}{\partial \Delta T} \end{bmatrix}$$

This matrix is essentially a matrix of direction cosines from the user to the GPS satellites:

$$A = \begin{bmatrix} \frac{X^1 - X_R}{R_1} & \frac{Y^1 - Y_R}{R_1} & \frac{Z^1 - Z_R}{R_1} & 1.0 \\ \frac{X^2 - X_R}{R_2} & \frac{Y^2 - Y_R}{R_2} & \frac{Z^2 - Z_R}{R_2} & 1.0 \\ \vdots & \vdots & \vdots & \vdots \\ \frac{X^n - X_R}{R_n} & \frac{Y^n - Y_R}{R_n} & \frac{Z^n - Z_R}{R_n} & 1.0 \end{bmatrix}$$

where $X^i$, $Y^i$, $Z^i$ are satellite coordinates, $X_R$, $Y_R$, $Z_R$ are approximate rover receiver coordinates, and $R_i$ are ranges to satellites.

The satellite measurements are usually considered uncorrelated and their stochastic characteristics are modeled by the following weight matrix:

$$W = \begin{bmatrix} W_1 & 0 & \cdot & 0 \\ & W_2 & \cdot & 0 \\ \vdots & \vdots & \vdots & \vdots \\ 0 & 0 & & W_n \end{bmatrix}$$

where weights are computed as:

$W_i=\sigma^2$ (inverse variance), or this matrix is usually assumed to be a unit matrix ($W_i=I$).

Since the number of unknowns (4) is usually less than the number of measurements (n), the previous over/determined model is transformed into the Least Squares normal equations model:

$$(A^T WA)x + A^T Wl = Nx + u = 0$$

The solution of this model is:

$$x = -(A^T WA)^{-1}(A^T Wl) = -N^{-1}u$$

Vector x contains the position (or velocity) and receiver clock bias (or drift) unknowns. In DGPS mode, to model the effects of selective availability(SA) the E(l)=f(x)=Ax model can be split up into two parts:

$$E(l_{SA}+\Delta l) = f(x_{SA}+\Delta x) = A(x_{SA}+\Delta x)$$

where $l_{SA}$ is the measurement vector affected by selective availability and other errors, $x_{SA}$ is the solution vector affected by selective availability and other errors, $\Delta l$ is the differential corrections applied in measurement domain (PRC and RRC).

$\Delta x$ is the differential correction in the position/velocity domain.

The solution to this model is:

$$x_{RT} \cong x_{PP} = (x_{SA} + \Delta x) = -(A^T W A)^{-1} [A^T W (l_{SA} + \Delta l)]$$

In real time DGPS, the correction in position/velocity domain ($\Delta x$) is not explicitly derived, but is implicitly contained in the realtime DGPS position/velocity ($x_{RT}$) solution computed in the receiver. In one embodiment, the remote rover unit stores a receiver time and position/velocity affected by selective availability ($x_{SA}$) without the need for real time differential correction service. The remote rover unit also stores satellite selection (PRN records) information in order to keep track of what satellites were used in the position/velocity fix. Back in the office, pseudorange and pseudorange rate corrections (PRC and RRC) are computed for each GPS satellite vehicle (SV), using reference station ("base receiver") measurements. Using the PRC and RRC vectors as differential measurements ($\Delta l$), a vector of position/velocity corrections ($\Delta x_{PP}$) is computed for the rover unit using the same Least Squares model described above:

$$\Delta x = -(A^T W A)^{-1} (A^T W \Delta l).$$

This is a first order correction in position/velocity domain and it changes non-differential positions by values with an order of magnitude of 100 m (based on current selective availability). The final result of this algorithm is a set of postprocessed differential positions/velocities ($x_{PP}$).

$$X_{PP} = X_{SA} + \Delta x_{PP}$$

The vector of differentially corrected positions/velocities ($X_{PP}$) is the main product of postprocessing during office computations.

In general, positioning with realtime measurement corrections is subject to various errors, and as a result, there is a difference between DGPS positions/velocities computed in real time and in postprocessing.

$$x_{RT} \neq x_{PP}$$

The RMS position errors at rover site are typically twice as great in real time as in postprocessing.

The difference between the realtime and postprocessed position/velocity estimates is due to the fact that measurement corrections received in realtime and computed in postprocessing differ. Generally, the realtime received measurement corrections are less accurate than postprocessed computed corrections. The reasons are: transmission delays, time propagation and interpolation, base station receiver errors and different atmospheric corrections in RT vs PP. The difference between realtime and postprocessed corrections is a double difference measurement correction, in vector notation:

$$\nabla \Delta l = PRC_{RT} - PRC_{PP}$$

where $PRC_{RT}$—is a vector of pseudorange or pseudorange rate corrections received in realtime.

$PRC_{PP}$—is a vector of pseudorange or pseudorange rate corrections computed in postprocessing.

Using this vector of double difference measurements ($\Delta \nabla l$) in the same Least Squares model as described above, the difference between realtime and postprocessed position is computed from the equivalent double difference model:

$$\Delta \nabla X = -(A^T W A)^{-1} (A^T W \Delta \nabla l =)$$

This is then applied to $X_{RT}$ $$X_{PP} = X_{RT} + \Delta \nabla X = X_{SA} + \Delta X_{PP}$$

This second order correction essentially adjusts the realtime positions by a relatively small amount (e.g., order of magnitude of 1 meter) and typically improves rover accuracies by a factor of two. The significance of the second order correction is that, it removes the realtime measurement corrections from the position/velocity fix and replaces them with postprocessed corrections computed in the software application.

In summary, the second order correction of realtime differential GPS data is accomplished by differencing realtime and postprocessed measurement corrections. The realtime corrections are stored in realtime with other (e.g., position, time and satellite selection) information at the rover unit. The postprocessed corrections are computed from data collected at a known location at the base station. The double difference measurement correction vector is used in a Least Squares model to estimate the second order corrections in the position and/or velocity domain. The second order corrections are then used to adjust the realtime differential GPS positions/velocities to postprocessed positions/velocities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to hereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for determining a position by performing postprocessing of a realtime differential GPS position, comprising the steps of:

a) receiving a realtime pseudorange correction vector;

b) adjusting non-differential measurements according to the realtime pseudorange correction vector to determine a realtime differential position;

c) storing the realtime differential position and the realtime pseudorange correction vector;

d) performing postprocessing to determine a postprocessed pseudorange correction vector;

e) adjusting the realtime differential position as a function of a difference between the realtime pseudorange correction vector and the postprocessed pseudorange correction vector to produce a postprocessed realtime differential GPS position;

f) displaying the postprocessed realtime differential GPS position.

2. The method of claim 1, wherein a remote rover unit containing a GPS receiver is used to receive the realtime pseudorange correction vector, determine the realtime differential position, and store the realtime differential position and the realtime pseudorange correction vector in the field.

3. The method of claim 2 further comprising the steps of:

computing position from pseudoranges;

computing velocity from pseudorange rates;

correcting real time differential positions and velocities to post-processed differential positions and velocities from pseudorange corrections and range rate corrections.

4. The method of claim 1, further comprising the steps of:

receiving a realtime pseudorange rate correction vector;

adjusting a non-differential pseudorange rate measurements according to the realtime pseudorange rate correction vector to determine a realtime differential velocity;

storing the realtime differential velocity and the realtime pseudorange rate correction vector;

performing postprocessing to determine a postprocessed pseudorange rate correction vector;

adjusting the realtime differential velocity as a function of a difference between the realtime pseudorange rate correction vector and the postprocessed pseudorange rate correction vector to produce a postprocessed realtime differential GPS velocity;

displaying the postprocessed realtime differential GPS velocity.

5. The method of claim 1 further comprising the step of simultaneously adjusting the realtime differential position with a plurality of sets of base station data.

6. A method for determining improved positions by performing postprocessing on realtime differential GPS positions, comprising the steps of:

reading data that was stored in the field, comprising realtime differential positions and realtime measurement corrections;

reading a database containing GPS information generated from at least one base station;

calculating postprocessed measurement corrections according to the GPS information from the database;

adjusting the realtime differential positions according to the realtime measurement corrections and the postprocessed measurement corrections to determine the improved positions;

outputting the improved positions.

7. The method of claim 6, wherein a remote rover unit containing a GPS receiver and a memory is used to process and store the realtime differential positions and the realtime measurement corrections.

8. The method of claim 6, further comprising the steps of:

reading data that was stored in the field, comprising realtime differential velocities and realtime measurement corrections corresponding to the velocities;

reading a database containing GPS information generated from at least one base station;

calculating postprocessed measurement corrections according to the GPS information from the database;

adjusting the realtime differential velocities according to the realtime measurement corrections and the postprocessed measurement corrections to determine improved velocities;

outputting the improved positions.

9. The method of claim 6, further comprising the step of simultaneously adjusting the realtime differential position with a plurality of sets of base station data.

10. An apparatus for determining a postprocessed position by performing postprocessing on a realtime differential GPS position, comprising:

an input/output interface for accepting a realtime differential position and a realtime pseudorange correction vector that was processed and stored by a rover unit while in the field;

a memory coupled to the input/output interface for storing computer code instructions relating to a GPS postprocessing procedure;

a mass storage device coupled to input/output interface for storing GPS information generated by a base station;

a processor coupled to the input/output interface that performs postprocessing on the GPS information according to the computer code instructions to determine a postprocessed pseudorange correction vector, wherein the postprocessed position is determined by applying a difference vector, representing a difference between the realtime pseudorange correction vector and the postprocessed pseudorange correction vector, to the realtime differential position.

11. The apparatus of claim 10 further comprising a rover unit detachable coupled to the input/output interface containing a GPS receiver and a memory, wherein the rover unit is used to determine the non-differential position, determine the realtime differential position, and store the realtime differential position and the realtime pseudorange correction vector.

12. The apparatus of claim 10, wherein the processor performs postprocessing on the GPS information according to the computer code instructions to determine a postprocessed velocity correction vector, wherein a postprocessed velocity is determined by applying a difference vector, representing a difference between a realtime velocity correction vector and a postprocessed velocity correction vector, to the realtime differential velocity.

13. The apparatus of claim 10, wherein the processor simultaneously adjusts the realtime differential position with a plurality of sets of base station data stored in the mass storage device.

* * * * *